US012225858B2

United States Patent
Udd

(10) Patent No.: US 12,225,858 B2
(45) Date of Patent: Feb. 18, 2025

(54) METHOD AND AN ARRANGEMENT FOR MANAGING AND CONTROLLING THE LIFETIME OF A TREE HANDLING SYSTEM FOR A FOREST MACHINE

(71) Applicant: Komatsu Forest AB, Umeå (SE)

(72) Inventor: Erik Udd, Färila (SE)

(73) Assignee: Komatsu Forest AB, Umeå (SE)

( * ) Notice: Subject to any disclaimer, the term of this patent is extended or adjusted under 35 U.S.C. 154(b) by 583 days.

(21) Appl. No.: 17/596,729

(22) PCT Filed: May 14, 2020

(86) PCT No.: PCT/SE2020/050494
§ 371 (c)(1),
(2) Date: Dec. 16, 2021

(87) PCT Pub. No.: WO2020/256614
PCT Pub. Date: Dec. 24, 2020

(65) Prior Publication Data
US 2022/0338428 A1 Oct. 27, 2022

(30) Foreign Application Priority Data
Jun. 18, 2019 (SE) .................................... 1950738-3

(51) Int. Cl.
*A01G 23/08* (2006.01)
*A01G 23/06* (2006.01)
(Continued)

(52) U.S. Cl.
CPC ............ *A01G 23/08* (2013.01); *A01G 23/06* (2013.01); *B66C 23/905* (2013.01); *G01L 5/0071* (2013.01); *B66C 2700/084* (2013.01)

(58) Field of Classification Search
CPC ............ B66C 23/905; B66C 2700/084; G01L 5/0071; A01G 23/083; A01G 23/00;
(Continued)

(56) References Cited

U.S. PATENT DOCUMENTS

| 5,531,122 A | 7/1996 | Chatham et al. |
| 2006/0243180 A1 | 11/2006 | Sundermeyer et al. |

(Continued)

FOREIGN PATENT DOCUMENTS

| EP | 3488686 A1 | 5/2019 |
| WO | 2017/198504 A1 | 11/2017 |
| WO | 2018/070924 A1 | 4/2018 |

OTHER PUBLICATIONS

International Search Report and Written Opinion issued for International Patent Application No. PCT/SE2020/050494, dated Jun. 10, 2020 in 12 pages.

(Continued)

*Primary Examiner* — Mohammad Ali
*Assistant Examiner* — Dhruvkumar Patel
(74) *Attorney, Agent, or Firm* — Knobbe, Martens, Olson & Bear, LLP

(57) ABSTRACT

A method and arrangement are for managing a tree handling system for a forest machine. The method includes obtaining sensor data that represent a current loading on the tree handling system and determining a key indicator that describes a measured value that is representative of the risk of partial damage based on the current loading. A current partial damage value can be compared with a normative partial damage value for a normative operating state to determine a change that would cause the current partial damage value to return to or approach a level corresponding to the normative partial damage value. The change can be executed by an actuator, which is coupled to a control unit, (Continued)

Figure 1:
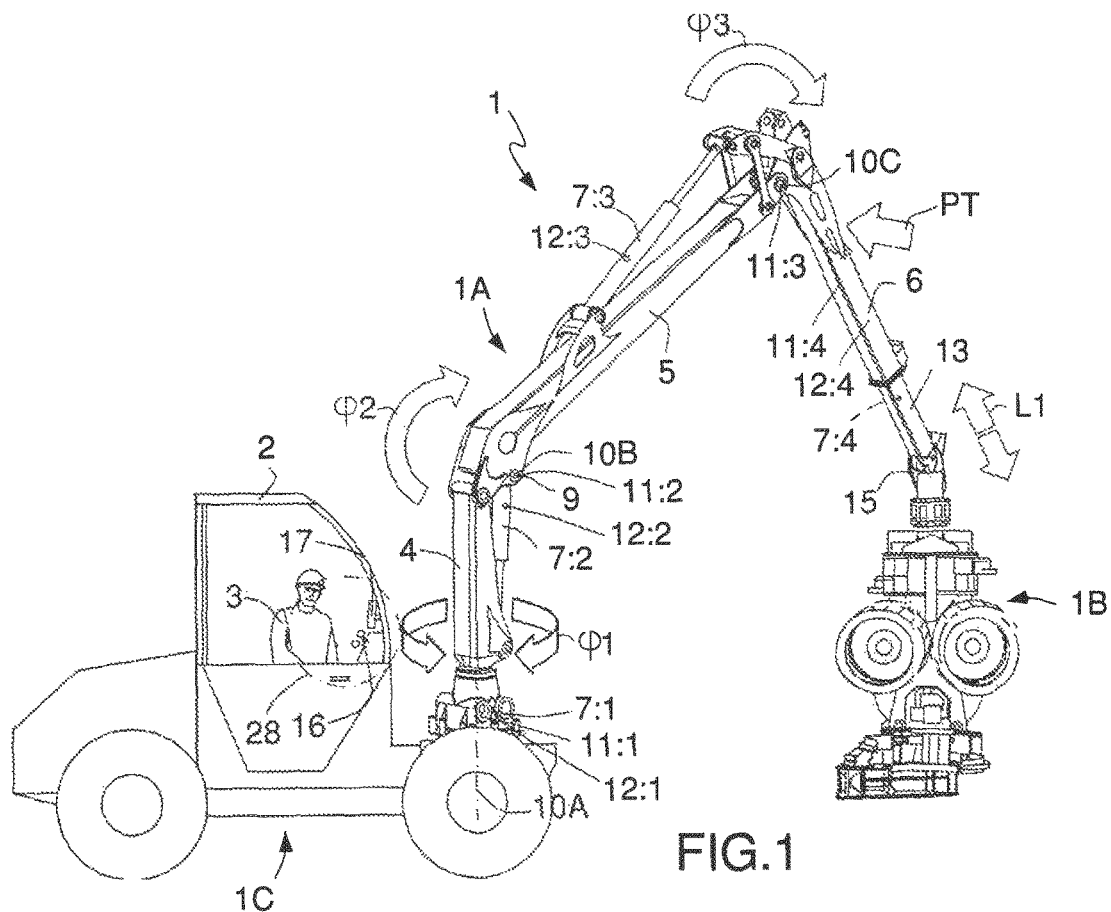

that limits hydraulic flow to at least one execution means to limit the loading of the tree handling system to a predetermined maximum loading value.

18 Claims, 6 Drawing Sheets

(51) Int. Cl.
 B66C 23/90 (2006.01)
 G01L 5/00 (2006.01)
(58) Field of Classification Search
 CPC ......... G01M 5/0033; E02F 9/26; E02F 9/264; E02F 9/267; G05B 13/026; G01N 33/0083
 See application file for complete search history.

(56) References Cited

U.S. PATENT DOCUMENTS

| | | | |
|---|---|---|---|
| 2012/0323453 A1* | 12/2012 | Havimaki | G07C 5/085 |
| | | | 701/50 |
| 2013/0233448 A1 | 9/2013 | Schrubbe et al. | |
| 2015/0253151 A1 | 9/2015 | Inberg et al. | |
| 2017/0089044 A1* | 3/2017 | Chitty | G01M 5/0033 |
| 2017/0334686 A1 | 11/2017 | Hess | |
| 2018/0058046 A1 | 3/2018 | Chitty et al. | |
| 2019/0187679 A1* | 6/2019 | Strudwicke | G05B 23/0272 |
| 2019/0297793 A1* | 10/2019 | Eliasson | B27B 17/0058 |

OTHER PUBLICATIONS

The extended European search report issued in European Patent Application No. 20826734.4, dated Sep. 20, 2023 in 9 pages.

* cited by examiner

METHOD AND AN ARRANGEMENT FOR MANAGING AND CONTROLLING THE LIFETIME OF A TREE HANDLING SYSTEM FOR A FOREST MACHINE

CROSS-REFERENCE TO RELATED APPLICATIONS

This application is the U.S. National Phase under 35. U.S.C. § 371 of International Application PCT/SE2020/050494, filed May 14, 2020, which claims priority to Swedish Patent Application No. 19507383, filed Jun. 18, 2019. The disclosures of the above-described applications are hereby incorporated by reference in their entirety.

TECHNICAL FIELD OF THE INVENTION

The present invention relates to a method and an arrangement for managing and controlling the lifetime of a tree handling system for a forest machine according to the preamble of claims 1 and 11, respectively.

BACKGROUND

A forest machine, such as a harvester or a forwarder, is equipped with a tree handling system, comprising a hydraulically powered driven crane, which at its free end also carries a hydraulically powered tree handling unit, for example in the form of a harvester aggregate or a timber grip. An operator manages the tree handling system for performing various operations, for example felling and preparing trees on roots. Operating the tree handling system is a demanding task that requires extensive professional skills. Learning to operate the tree handling system efficiently and, for example for the crane, in a careful manner, involves much training. The efficiency and availability for operation of the tree handling system are important, as the costs of investing in a new tree handling system are usually high. Detection of damage, control and follow-up on damage as well as prevention of damage to a tree handling system are of utmost importance to avoid costly idleness. Damage usually involves impairment or reduction of the lifetime of an object. The lifetime can be pre-determined or be optional. Operating mode or operating conditions refer to a load or loading that can cause such damage. The strength or the robustness of an object is reduced over time due to loading of it.

The lifetime of the tree handling system is substantially determined by its mechanical structure and the way in which the constituent components of the tree handling system are loaded in the movements that the system performs during its lifetime. In the current tree handling systems, the mechanics is dimensioned so that the mutually moveable parts that are included in the system must be able to perform the hardest movement pattern imaginable during its entire specified or theoretically calculated lifetime. A crane included in such a system typically comprises a number of mutually moveable arm parts such as a twistable rack, lifting and rocker arms, which are articulately joined to each other via joints and hydraulically effective power cylinders. The power that is transferred in a hydraulic system and thereby to the various parts of the tree handling system, which are affected by force from hydraulically effective drive power, is defined by the fluid pressure ($N/m^2$) multiplied by the volume flow rate ($m^3$/second). The vehicle on which the crane of the tree handling system is mounted is equipped with a hydraulic control system by which the operator, via a driver interface with control sticks or a similar impact means, can swing the crane in different angle positions in a horizontal plane, manoeuvre the crane's most utmost nose or tip to different positions in a vertical plane and control the outermost functions of the tree handling unit. The term operator should be interpreted in its widest sense and can also refer to a computer in case it relates to forest machines that are managed by means of so-called artificial intelligence (AI).

In order for the loadings on the mechanical components included in the tree handling system, for example bearings, shafts, struts and hydraulic cylinders, not to be too excessive, limits are set for the highest permissible moments and speeds of these. These limits are set already in the process of development and design of the tree handling system. Limits for the maximum permissible shaft moment, dynamic movements and impact forces are set on the basis of the calculated lifetime of the tree handling system and the fatigue diagrams for the mechanical structures.

The mechanical loading on a mechanical component and the resultant risk of partial damage at a certain time can depend on a number of different factors, which are not directly related to load but rather related to function, such as the ability of an operator to run the tree handling system in a careful manner from a loading point of view. Yet another example of factors that can be considered as function-related stems from the mutual configuration of moveable arm parts, which an operator has selected for a certain work operation, the operator's selection of acceleration and the load that the crane carries at its free end. This means that if the crane has an advantageous position, i.e. the configuration between its mutually moveable arm parts is favourable, or the crane only carries a small load at its free end, they can raise the limits for the highest permissible force and moment impacts can be exceeded without the loading on the components being excessive. Thereby, a crane that executes working movements, which are gentle on the mechanics, will have better performance in the form of lifetime than a crane that is run in an unfavourable manner. Likewise, a crane that handles smaller loads, for example a lighter harvester aggregate than it is intended for, will have a higher performance in the form of lifetime. Moreover, the forces and moments to which the crane is exposed, to a great extent depend on the operator's competence and ability to run the crane in a gentle and careful, but still efficient, manner from a production point of view.

PRIOR ART

It is thus previously known to calculate the lifetime of hydraulically powered tree handling systems by performing different kinds of analyses of the load that affects the tree handling system for calculating partial damage. For the calculation of partial damage occurring in a tree handling system at so-called spectrum loading, i.e. dynamic loading that occurs irregularly and gives rise to so-called variable amplitude loading, Palmgren-Miner's partial damage analysis is usually applied.

For reduction of the amount of input data of measured input signals from sensing elements, the so-called Rainflow method is usually applied, by which complicated load sequences of comprehensive data can be converted into damage-equivalent cycles. In practice, input data are hereby registered in the form of occurring and registered load and output data in the form of stress range (amplitude) and average voltage for one or a plurality of specifically loaded parts of a tree handling system.

By means of Palmgren-Miner's partial damage analysis for the calculation of lifetime, so-called partial damage values are obtained. According to the analytical model providing the basis for the hypothesis, each cycle with an amplitude uses a certain part of the total lifetime of the parts comprised in a tree handling system and thereby the system overall. A partial damage can be calculated during a certain period. Theoretically, fractures are calculated to arise when the partial damage exceeds 1.

Common to the prior art methods and arrangements is that they manage and control the lifetime of tree handling systems on the basis of the accumulated partial damage, i.e. a cumulative partial damage amount to which each new observed partial damage is added. Sensors detect the loading of the tree handling system on the basis of sensor data from sensing elements. A control unit calculates an accumulated partial damage during operation, which constitutes the sum of all partial damages that have arisen. Via an interface, the control unit can present an operator with information about accumulated partial damage. The control unit is adapted to receive information about the loading on the tree handling system and determine various partial damage values, which are assessed to occur on the tree handling system at different loadings. The various estimated partial damages are added to an accumulated partial damage, which constitutes an estimate of the used lifetime of the tree handling system. The control unit can compare the accumulated partial damage with a normative accumulated partial damage of a tree handling system with equivalent operating time and is adapted to limit the loading of the tree handling system to a maximum permissible loading value, if the accumulated partial damage exceeds the normative partial damage by a pre-determined acceptable maximum partial damage value. The difference between said respective curves constitutes a value that determines how much the normative curve can be overloaded, before the control unit initiates a limitation of the loading on the tree handling system.

One problem with this prior art method of managing and controlling the lifetime is that the feedback between the accumulated partial damage and any adjustment (limitation) of the current loading on the tree handling system to avoid partial damage makes it difficult for an operator to run the machine with sensorial monitoring in an efficient and also, from a machine damage point of view, careful way.

In practice, you could say that the known way of managing and controlling the lifetime of a tree handling system of forest machines provides information about an already occurred accumulated partial damage and thus lacks the dynamic feedback and the transfer of operational information that can serves as support for an operator in order to sensorially be able to manage and control the operating state of the tree handling system so that partial damage can be avoided.

This lack of dynamic feedback between partial damage, adjustment (limitation) of the current loading on the tree handling system and the current operating state of the tree handling system makes it difficult for an operator of a forest machine to sensorially monitor the operation of the tree handling system, striving to operate the machine in a both efficient and, from a machine-damage point of view, careful manner. Furthermore, it should be understood that if an operator has to monitor the machine entirely sensorially, i.e. with the sense organs of the body, sight, hearing etc. to avoid damage, it may in certain cases result in the operator being led in the wrong direction (misled) and that the machine damage that the operator believes can be avoided is actually worsened due to an unsuitable operating state of the tree handling system.

A work operation with a tree handling system, which may typically comprise felling and processing of the tree, can be regarded as being done in an efficient and, from a machine damage point of view, careful way by an operator. However, if for example processing of a tree trunk in the harvester aggregate takes place with the tree trunk in a less favourable angle selected by the operator or in a directly unsuitable crane angle, the work operation may at worst actually damage the machine.

As indicated above, it should be understood that the prior art method for monitoring and managing the lifetime based on an accumulated partial damage and/or by presenting information about spent lifetime to the operator, clearly does not provide the knowledge or feedback information about the selected operating state that enables the operator to change the driving behaviour to avoid or at least reduce the risk of partial damage.

In this context, it should also be understood that an operator purely theoretically has an almost indefinite number of alternative ways of executing each work operation. If the operator had improved possibilities of selecting optimum operating conditions in each case to be able to both avoid damage and work more efficiently, it should in reality be possible to execute each work operation in a substantially more careful way for the tree handling system without forgoing the desired production results.

Moreover, sensorially managing and controlling the lifetime of the tree handling system is being limited, not least due to the development of modern forestry towards large scale operation and complexity. For example, components in a tree handling system can be replaced by corresponding but more modern and hence more powerful components during the lifetime of a tree handling system. As an example, ever so often the harvester aggregate, which has originally been suspended at the crane's free end, is replaced by a new aggregate with stronger power and the feed roller motor of which will thus generate higher feeding force than the crane of the tree handling system was originally constructed for. The possibilities for an operator to sensorially consider how the tree handling system in the most efficient way, from a damage and production point of view, should be operated and handled can be very difficult, especially for a less experienced operator.

SUMMARY OF THE INVENTION

A first object of the present invention is thus to achieve a method for managing and controlling the lifetime of a tree handling system of a forest machine, which solves the problem outlined above and improves the possibilities of obtaining an expected lifetime.

Another object of the invention is to achieve an arrangement for managing and controlling the lifetime of a tree handling system of a forest machine, which facilitates an operator's options for sensorially manage and control the machine in such a manner that the mechanics can be utilized to its maximum and thus also enables a less experienced operator to utilize the full capacity of the machine without increasing the risk of damage substantially.

Both of these objects of the invention are obtained through a method and an arrangement of the type as set forth in claims 1 and 11, respectively. Further characteristics and advantages of the invention appear from the dependent claims.

The insight that forms the basis of the invention is that better possibilities of managing and controlling the lifetime of a tree handling system of a forest machine can be obtained if the control parameters used for the lifetime calculation are used as feedback and relate to a real causal link, i.e. in principle it is about achieving a system that can work dynamically by determining a key indicator Ni:1-Ni:n that describes a measured value X that relates to the operation of the tree handling system and is representative of the risk of partial damage in relation to specific reporting about a current operating state db:1-db:n of the tree handling system. The key indicator Ni:1-Ni:n thus describes an operator's mode of running, operating or manoeuvring the tree handling system and thereby also the risk of partial damage.

By comparing at least one of the determined current partial damage values SL, SM, SH with a normative partial damage value SLX, SMX, SHX for a normative operating state db:1-db:n of the tree handling system corresponding to the current key indicator Ni:1-Ni:n and thereby also determine a change that affects the measured value X of the key indicator Ni:1-Ni:n in such a manner that the current partial value SL, SM, SH reverts to or at least approaches a level corresponding to the normative partial damage value SLX, SMX, SHX for the current key indicator, the operator that sensorially monitors the machine obtains support that makes it possible to perform work in an operating state suitable for the machine, implying that the machine is not exposed to unnecessary loadings and thereby lifetime-reducing damage. As the key indicator Ni:1-Ni:n describes a measured value X that is based on a current running operating state db:1-db:n, it should be understood that the measured value X is not just about impact force as such, but also about the operator's selection of operating state among the substantially indefinite number of operating states that would alternatively be available to the operator.

In an embodiment of the invention, it is worth considering determining at least one key indicator for a first work unit or group of machine units that are included in for example a crane and at least one key indicator for a second work unit or group of machine units. Other ways for various types of reference groups of dividing a plurality of various key indicators are also imaginable.

Thus, the invention enables identification of changes of partial damage of a tree handling system of a forest machine, to store information about the changes and to use information about the changes to present key figures, which momentarily describe a combination of the current operating state and the occurrence of partial damage to the tree handling system. Presented in a suitable operator interface, this information can serve as support of or supplement to an operator's bodily senses and thereby also cause operators to change their driving behaviour in order to reduce the risk of partial damage.

BRIEF DESCRIPTION OF FIGURES IN DRAWING

Figure 2:
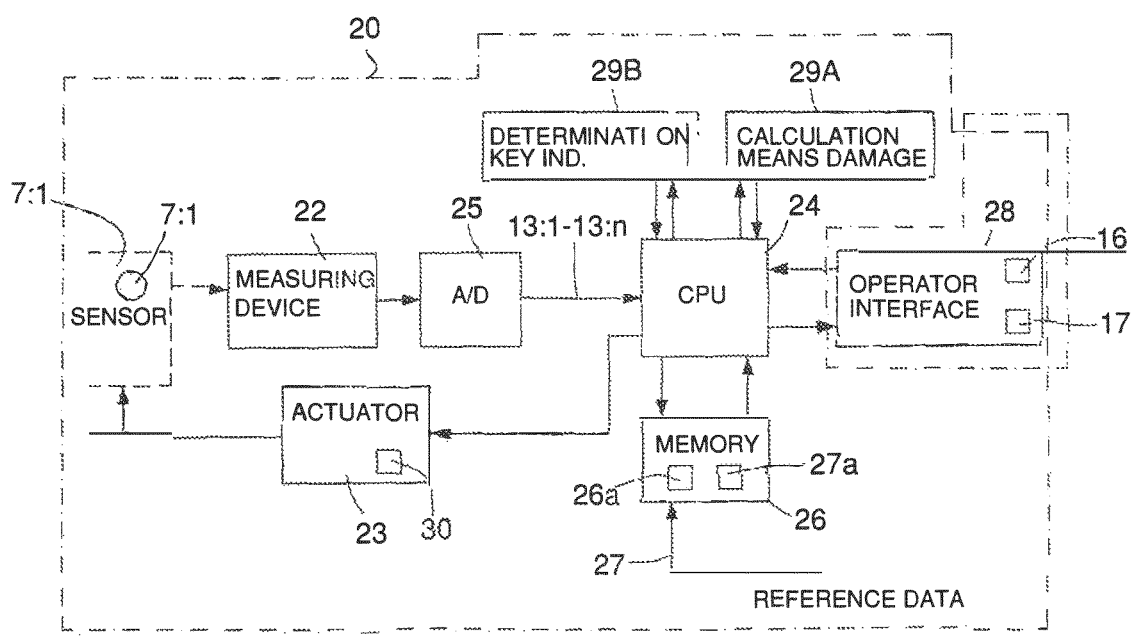
Figure 3:
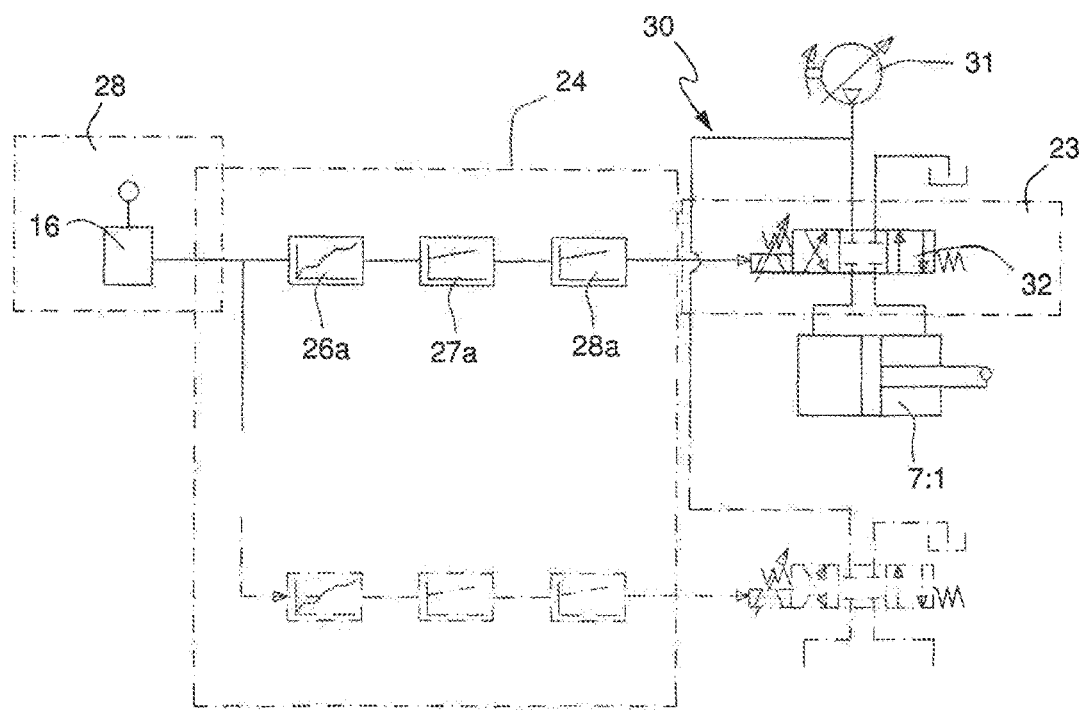
Figure 4:
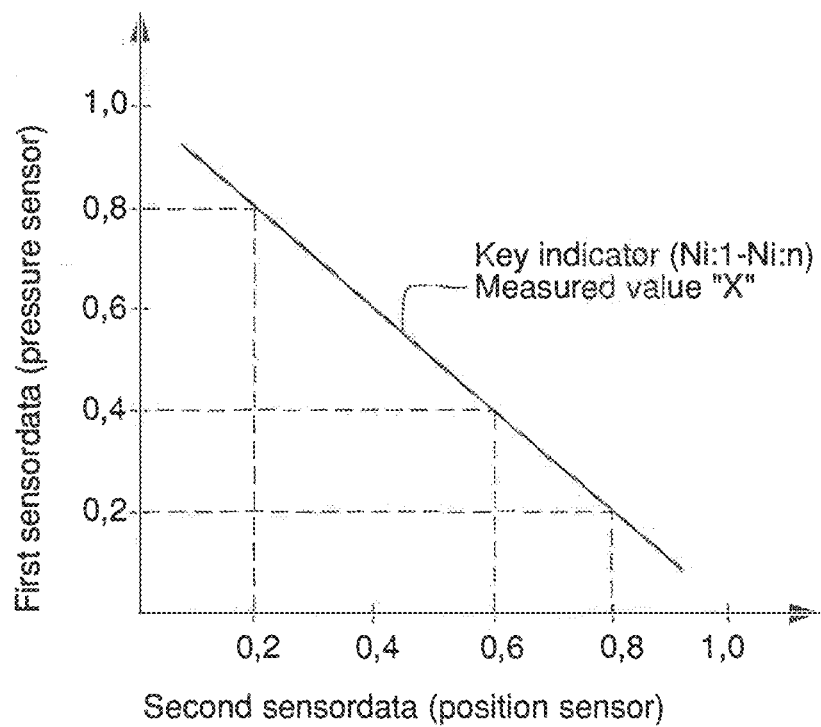
Figure 5A:
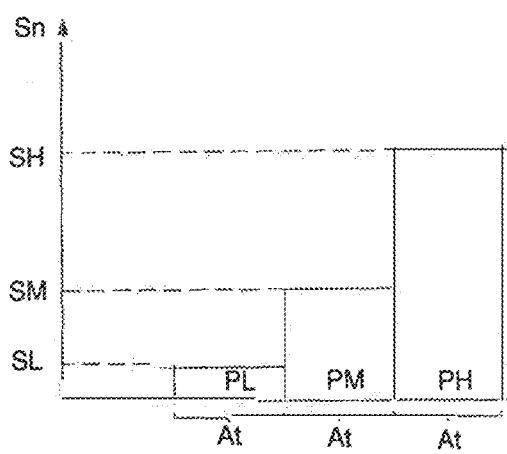
Figure 5B:
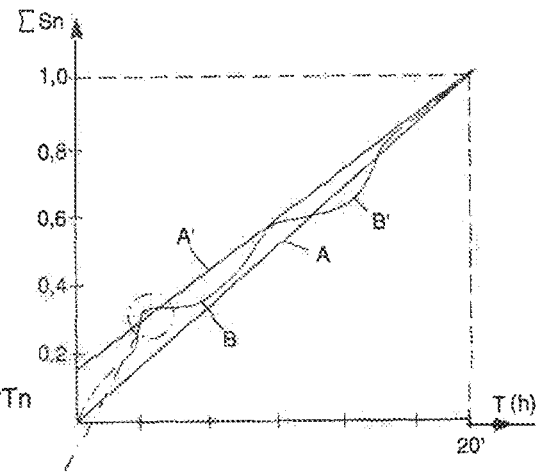

In the following, the invention is described in more detail based on an exemplary embodiment, shown in the accompanying drawing; wherein;

FIG. 1 schematically shows an arrangement for management and control of the lifetime of a tree handling system included in forest machines according to the present invention, FIG. 2 schematically shows a block diagram of a system included in an arrangement for the management and control of the lifetime of a tree handling system according to the present invention, FIG. 3 schematically shows a flow chart of a system with an actuator that makes it possible to vary the loading on the execution members included in a tree handling system, FIG. 4 schematically shows a graph in a diagram of how a measured value X of a key indicator can vary depending on the operating state of the tree handling system selected by an operator, wherein the Y-axis of the diagram shows the first sensor data that are loading-based from pressure sensors, and the X-axis shows second sensor data that are representative of the mutual relationship between at least two adjustable or manoeuvrable units of the tree handling system and thus in practice immediately related to the operator's selection of operating state, for example selection of crane angle, FIG. 5A shows in a diagram how accumulated partial damage to a tree handling system can vary due to the relative activation period At during which a partial damage Sn is determined, wherein the partial damage is divided into three classes denoted PL, PM, PH, FIG. 5B shows in a diagram a number of graphs in as curves how an accumulated partial damage to a tree handling system can vary with the operating time in hours T, in the diagram, A denotes a pre-determined normal curve and A' a loading-limiting curve, B denotes the current operating point.

Figure 5C:
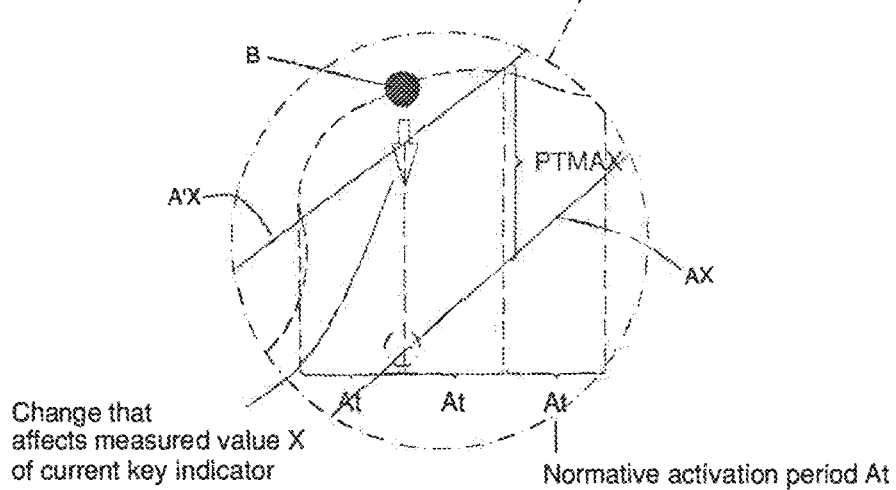
Figure 6:
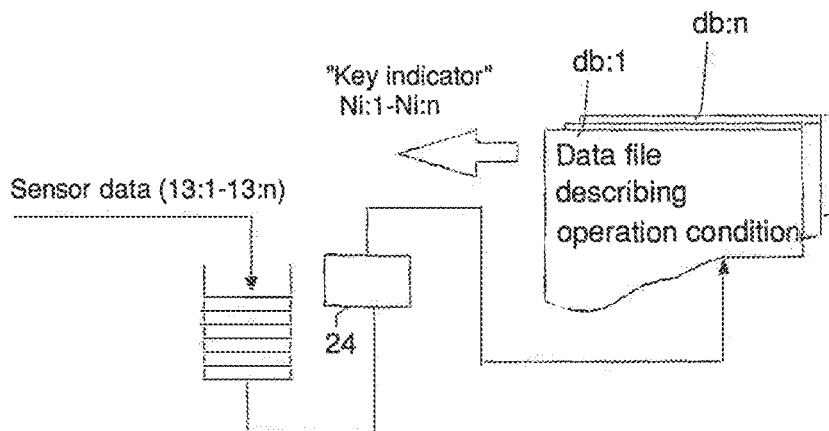
Figure 7:
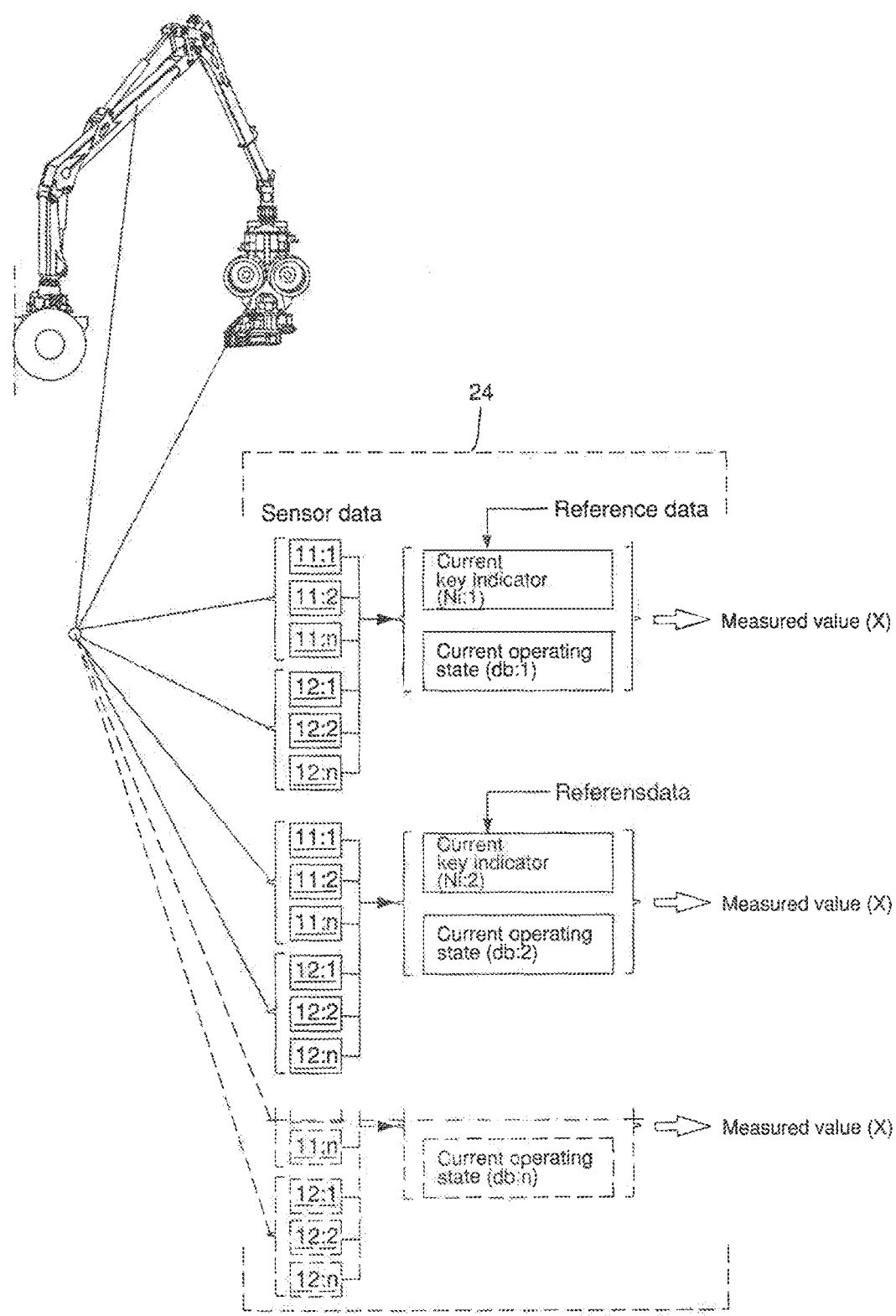
Figure 8:
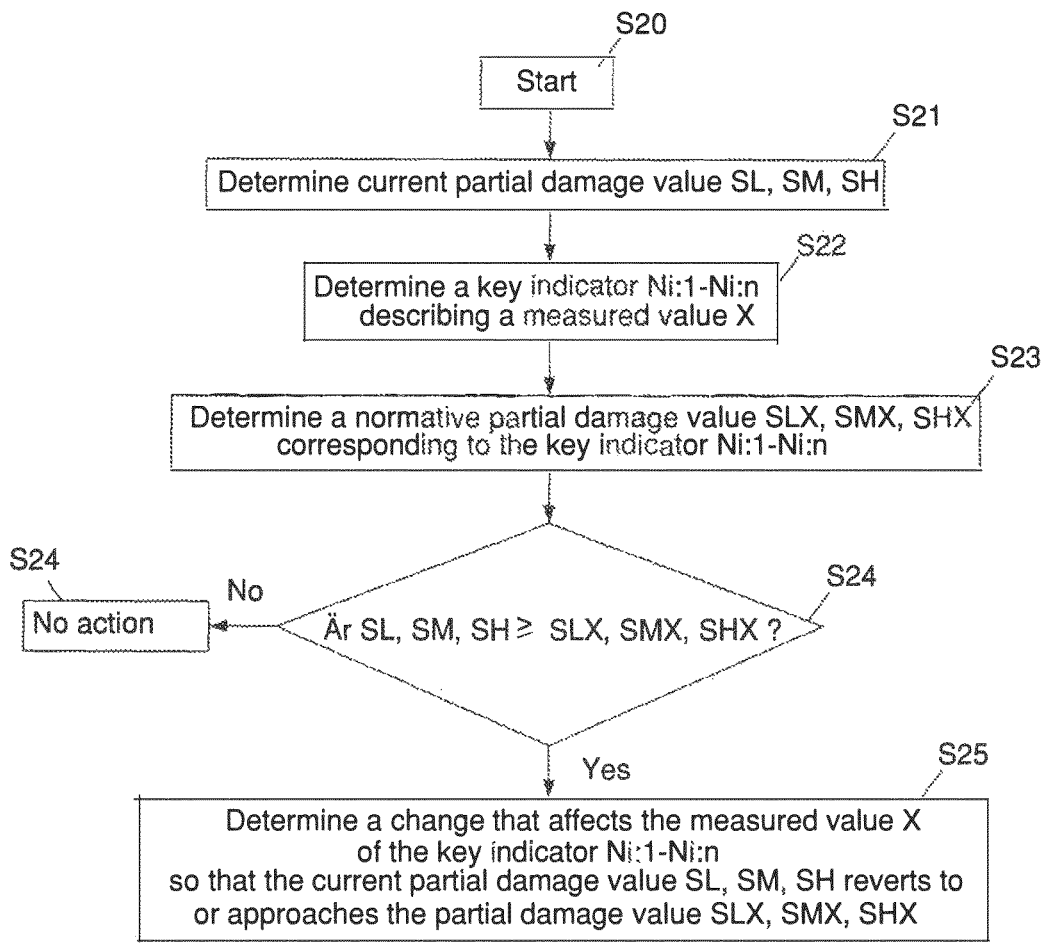
Figure 9:
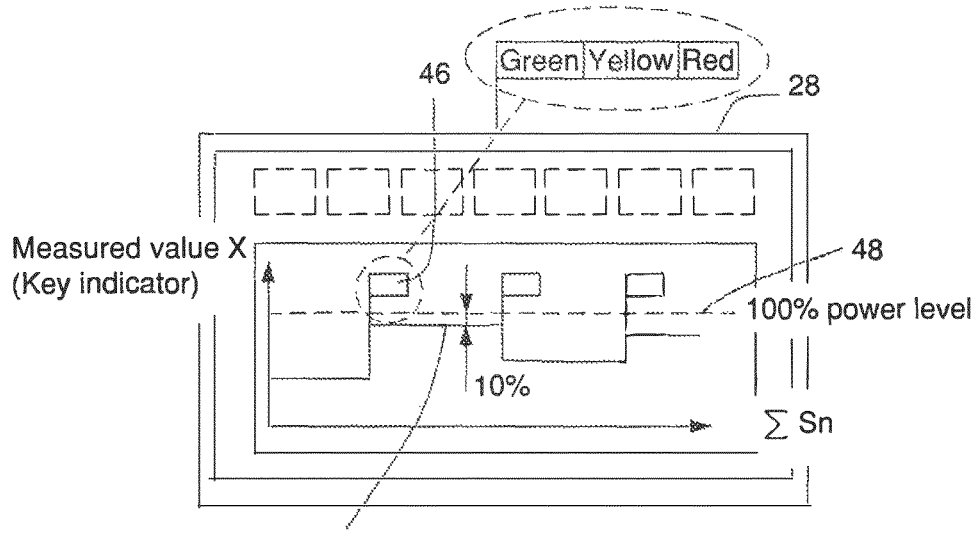
Figure 10:
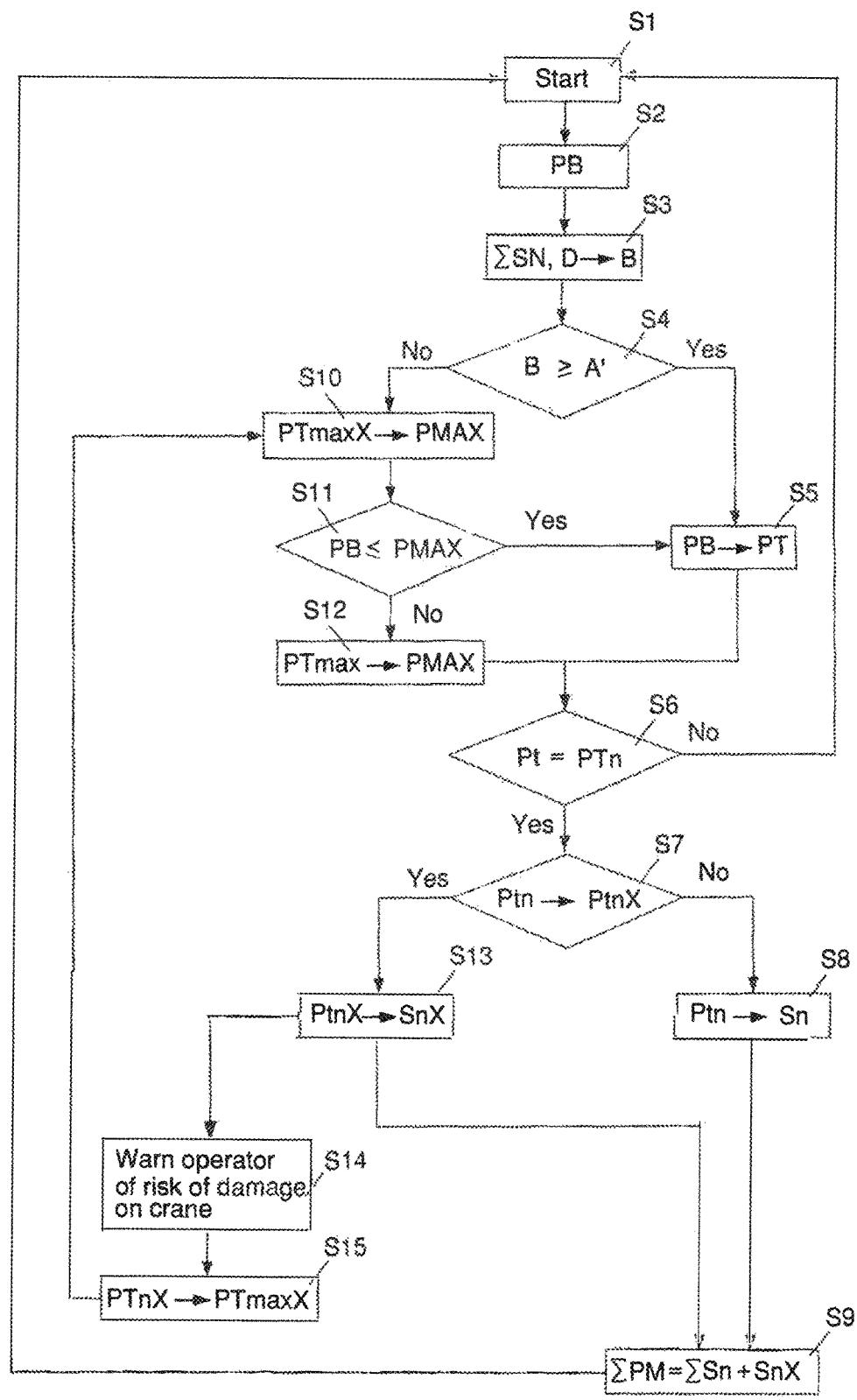

FIG. 5C shows a detail enlargement, from which an operating point B for a loading PB based on a current operating state db:1-db:n selected by an operator during an activation period At appears, and in which enlargement AX denotes a normative curve and A'X a partial damage-limiting curve, corresponding to a normative running operating state dbX:1-dbX:n of the tree handling system for the current running operating state db:1-db:n of the tree handling system, selected by the operator, FIG. 6 shows, by a block diagram of a system, how first and second sensor data 13:1-13:n are used for monitoring an operating condition and determining a key indicator Ni:1-Ni:n based on a data file describing the operating condition, FIG. 7 shows, by a block diagram, how first and second sensor data 13:1-13:n are used for monitoring an operating condition and determining a key indicator Ni:1-Ni:n and thereby a measured value X based on an operating state of the tree handling system selected by the operator, FIG. 8 shows a flow chart describing management and control of the lifetime of a tree handling system of a forest machine during an activation period At and how determined current actual partial damage values SL, SM, SH are compared with normative partial damage values SLX, SMX, SHX, which are selected on the basis of a determined key indicator (Ni:1-Ni:n) with a measured value X and how this measured value can be changed by means of an actuator included in the invention, FIG. 9 shows a user interface with a graphic representation on a display of a determined key indicator Ni:1-Ni:n with a measured value X that is presented on a first axis, i.e. the y-axis, and a cumulative variable, such as an accumulated partial damage $\Sigma$ Sn on a second axis, the x-axis, FIG. 10 shows a flow chart describing the manner in which an arrangement for managing and controlling the lifetime of a tree handling system works, and wherein a current partial damage value SL, SM, SH is compared with a normative partial damage value SLX, SMX, SHX, which is selected on the basis of a determined key indicator Ni:1-Ni:n with a measured value X and how a determined change of a measured value X, by means of an actuator, results in the current partial damage value SL, SM, SH reverting to or at least approaching a level corresponding to the normative partial damage value SLX, SMX, SHX.

DETAILED DESCRIPTION OF AN EMBODIMENT OF THE INVENTION

FIG. 1 schematically shows a hydraulically powered tree handling system generally denoted 1, comprising a 1A crane, which at its free end carries a tree handling unit 1B, which hereby is constituted by a harvester aggregate, but which alternatively could be constituted by a timber grip or the like. The tree handling system 1 is carried on a vehicle 1C, a so-called forest machine. A driver's cabin is denoted 2.

The crane 1A substantially comprises a first boom 4, which is designated stanchion or vertical boom, a second boom 5, which is designated lifting arm, and a third boom 6, which is designated rocker arm. The stanchion is 4 attached in a housing, which again is carried by the vehicle's chassis or a frame. The stanchion 4 and thereby the crane 1A can oscillate at an angle φ1 about a vertical axis 10A in a horizontal plane, which is illustrated by a double arrow in FIG. 1. Oscillation by the crane 1 about the vertical axis 10A in the horizontal plane takes place in the conventional manner by means of a first execution means 7:1 and is controlled by a first angle sensor 11:1.

The stanchion 4 and the lifting arm 5 are coupled together in a joint 9 for oscillation about a first horizontal axis 10B, which is controlled by a second execution means 7:2. An angle φ2 about the first horizontal axis 10B, between the stanchion 4 and the lifting arm 5, is controlled by a second angle sensor 11:2. In turn, the lifting arm 5 is coupled together with the rocker arm 6 in a second joint 11. The angle about a second horizontal axis 10C between the lifting arm 5 and the rocker arm 7 is manoeuvred by a third execution means organ 7:3. The angle φ3 between said lifting arm 5 and the rocker arm 7 is controlled by a third angle sensor 11:3. The rocker arm 6 has a moveable, projecting boom 13, and as is illustrated by a double arrow, the rocker arm can be extended or shortened by a length L1 in its longitudinal direction by way of a fourth execution means 7:4, which is accommodated inside the rocker arm 6. The crane 1A included in the tree handling system 1 thus comprises a number of arm parts 4, 5, 6 and 7, which are twistable relative to each other and between which arm parts, said position sensors 11:1-11:n are arranged. Said position sensors 11:1-11:n can thus emit a signal, which is a measure of the current axis' angle of torsion and thereby also the relative angle position of the arm parts and thereby the manoeuvring position overall of the crane as selected by the operator 3.

The position of a moveable unit is generally determined by an output signal from a resistive sensor, generally of the potentiometer type, which is mechanically coupled to the unit to be monitored. Position sensors of the resolver or pulse generation type can also be used for the purpose. Recently, gyro has also been introduced for measuring the relative state of moveable parts. It should be understood that the term position sensor according to the invention should be interpreted in its widest sense and in which term gyro should also be considered to be included.

The movements of the tree handling system 1 are managed and controlled by said operator 3 via an operator interface 28 that includes a manoeuvring unit with a control stick 16 or similar impact means in a driver's cabin 2. In the driver's cabin 2, there is also a graphic user interface for the operator 3 in the form of a monitor or display 17, which thus forms an indication means the purpose of which will be described in more detail in the following. For each execution means 7:1-7:n a respective pressure sensor 12:1-12:n is arranged, and a linear measure sensor can also be arranged, measuring the boom's 13 projecting length or distance L1 in the longitudinal direction of the rocker arm 6.

For each of the crane's 1 axes of motion 10A, 10B, 100, 10D, there is thus one or a plurality of position sensors that comprise said angle sensors 11:1-11:n as well as said linear measure sensors 11:4. The angles of torsion in the three axes 10A, 10B, 10C are denoted φ1-φ3 in the figure and extend along the rocker arm's 6 length denoted L1

FIG. 2 shows a diagnostic unit 20, included in the present invention, comprising a measurement means 22, which is coupled to an exemplified pressure sensor 12:1, and which senses the pressure of the crane's 1A execution means 7:1 for oscillation of the crane in a horizontal plane about the vertical axis 10A. The pressure sensor 12:1 can measure the internal pressure of the hydraulic fluid in the crane's execution means 7:1 for oscillation and thereby emit sensor data that comprise a steady state (Swedish: fortvarighets-och transienttillstånd) of said execution means.

The exemplified sensor 12:1 could clearly be constituted by any of the pressure sensors 12:1-12:n, angle sensors 11:1-11:n mentioned above of the various parts or means that are included in the tree handling system 1 or a combination of said sensors.

In an exemplifying object in the following, a first exemplary embodiment will be described closer to an arrangement according to the invention relating to the crane 1A included in the tree handling system 1 based on said first execution means 7:1 for oscillation of the crane and the pressure sensor 12:1 associated with this drive means.

In this context, it should be understood that an arrangement corresponding to the one described here can be disposed for calculation of partial damage to a single or an optional number of components that are included in a tree handling system 1. The selection of the component or the components that are monitored by sensors obviously depends on the loading values that are interesting to the calculation of partial damage to the tree handling system.

Also, with reference to FIG. 2, a microprocessor-based processing unit (CPU) 24 is coupled to the measurement means 22 and an A/D converter 25 arranged between said measurement means 22 and the control unit. It should be understood that the component selection indicated in this exemplified object between sensor 21 and control unit 24 is not limiting for the invention, but can vary depending on the type of sensor and the steady state of the crane 1 components to be measured. The diagnostic unit 20 further comprises a calculation means 29A coupled to the control unit for calculation of a damage arisen on the tree handling system 1, based on measured operational parameters via the sensor 12:1. In the following, the measurement data, which via the A/D converter 25 are addressed to the control unit 24, are generally designated first and second sensor data 13:1-13:n, wherein the first sensor data relate to data from pressure sensors that represent a current loading PT on at least one of the crane and the tree handling unit included in the present tree handling system, and the second sensor data relate to position sensor data representative of the mutual relationship between at least two in the tree handling system of for example the operator adjustable or manoeuvrable units.

The calculation means 29A is constituted by a so-called predictor with the purpose of predicting damage or breakdown of one or a combination of crane parts, which in this case in the exemplifying object is only constituted by the crane's 1A first execution means 7:1. The calculation means 29A is provided to perform a partial damage calculation. The diagnostic unit 20 also comprises a memory 26 for storage of results from each current partial damage calculation and accumulated partial damage. In the memory 26, a data file with specific reference data 27 can also be registered, which can take place in connection with renewal of the tree handling system 1 or the vehicle 1C on which the tree handling system is intended to be mounted. The diagnostic unit 20 also includes a means 29B for determination of a key indicator Ni:1-Ni:*n*, the function of which is described in more detail in the following.

The diagnostic unit 20 further comprises an actuator 23, which is operably coupled to the control unit 24 and thus also to the first execution means 7:1 for oscillation of the crane about the vertical axis 10A shown in the exemplified object. The actuator 23 is provided to adjust the first execution 7:1 operation based on said measurement means 22 to measure the value from the pressure sensor 12:1 in the execution means 7:1.

FIG. 3 further shows a hydraulic system 30, which is arranged to the crane's 1A various execution means 7:1-7:*n* for manoeuvring the crane. The hydraulic system 30 comprises a hydraulic pump 31 by which the first execution means 7:1 and other execution means 7:2-7:*n* are driven by hydraulic fluid that is supplied by the pump. However, in the exemplifying object the figure only shows the first execution means 7:1. Between the first execution means 7:1 (e.g. each execution means 7:1-7:*n*) and the pump 31, there is an electrohydraulic hydraulic valve 32 (e.g. a valve block) that controls the hydraulic fluid from the hydraulic pump 31 to the first execution means 7:1, so that the crane 1A can be manoeuvred in the desired way by the operator 3 by impact of the manoeuvring unit's control stick 16.

Purely functionally, the actuator 23 is constituted by said electric hydraulic valve 31 because it controls and adjusts the hydraulic flow and, as described initially, thereby also the power that is supplied to the first execution means 7:1 for oscillation of the crane 1A. The hydraulic valve 32 can be of the type that allows both the pressure and the flow to be controlled digitally.

The electric manoeuvring of the hydraulic valve 31 is handled via the control unit 24 and the operator's 3 control stick 16. The control unit 24 comprises software with adjustment structure, which in a synchronized manner can control the flow to and from the crane's 10 first execution means 7:1 for oscillation due to the control stick 16 state. The control stick 16 communicates with the control unit 24 respectively other components via an integrated CAN interface. Program routines control via PWM outputs proportional magnets in electrohydraulic pilot valves that are included in the hydraulic valve 32. In the memory 26 of the control computer 24, there are valve control curves 26a in the form of software, which are adapted to control of the hydraulic flow to the first execution means 7:1 for oscillation of the crane. Furthermore, there are correction factor curves 27a, 28a with which the valve control curves 26a can be parameter-adjusted in such a manner that the hydraulic flow from the pump 31, for example at full stick outer position of the control stick 16, can be limited in a pre-determined way. In the following, the actuator 23 is also designated action unit and its function according to the invention is described in more detail in the following.

The control unit 24 shown in FIG. 2 is thus adapted to control the operation of the crane 1 as regards information about the power (hydraulic power) PB requested by the operator 3 from said first execution means 7:1. The operator 3 thus requests the desired hydraulic power PB from the first execution means 7:1 and correspondingly clearly also to the other hydraulically effective drive assemblies 7:2-7:*n* that are included in the tree handling system 1 by impact of the control stick 16.

As mentioned above, the opening degree of the hydraulic valve 32 and hence the flow to the drive assembly 7a for oscillation of the crane is controlled by means of software that includes valve control curves 26a and said correction factor curves 27a, 28a. The pressure sensor 12:1 that is included in the first execution means 7:1 for oscillation of the crane is adapted to substantially continuously transmit the first sensor data 13:1 to the control unit 24 with information about the internal pressure of the execution means 7:1. With information about said internal pressure, the control unit 24 can estimate the loading PT on the crane 1 for the part that relates to said execution means (hydraulic cylinder). Other execution means 7:2-7:*n* and other parts equipped with pressure sensors 12:1-12:*n*, angle sensors 11:1-11:*n* or linear measure sensors can, according to the invention, obviously be sensed correspondingly and supply second sensor data 13:1-13:*n* to the control unit 24.

A tree handling system 1 of the present type is an expensive component. It is therefore desirable that the tree handling system 1 can obtain the same lifetime as the vehicle 10 overall. Thereby, extensive costs for repair or replacement of the tree handling system can be avoided. The lifetime of a tree handling system 1 is strongly bound up with the loading PT to which it is exposed during operation by an operator 3.

FIG. 1 illustrates the loading PT on the crane 1A generally with an arrow. Due to experience and statistical calculations, it is possible with good accuracy to determine how single loadings PT reduce the lifetime. In the following, a reduction of the theoretical lifetime is designated partial damage S. Partial damage can be expressed in parts, for example time, an estimated theoretical lifetime in operating hours. Partial damage can, for example, be expressed in millionths of the tree handling system's calculated lifetime in operating hours. When an accumulated partial damage $\Sigma$ Sn, which is due to single loadings n on the crane, reaches the value 1.0, the theoretical lifetime of the tree handling system is obtained.

FIG. 5A shows an example of a connection between partial damage Sn and single loadings PTn on a tree handling system 1. This connection is stored in the control unit's 24 connected calculation means 29. In this case, the single loadings PTn on the tree handling system 1 have been divided into three classes, namely PL, PM, PH. PL here corresponds to an area with low loading, PM corresponds to an area with medium loading, and PH corresponds to an area with high loading. In an area with lower loading than the one in the area PL, the loading on the tree handling system's 1 (the crane's 1A) first execution means 7:1 for oscillation is so low that no partial damage Sn is deemed likely to occur. When the crane's 1A first execution means 7:1 for oscillation is loaded in the area with a low loading, PL appears with a partial damage with a low value SL. When the crane's 1A first execution means 7:1 for oscillation is loaded in the area with a medium loading, PM appears with a partial damage with a medium value SM. When the crane's 1A first execution means 7:1 for oscillation is loaded in the area with a high loading, PH appears with a partial damage with a high value SH. It appears from the diagram that the value of the partial damage increases significantly with the loading on the first execution means 7:1 and hence the crane 1A. The single loading value, the PTn, which is applied to determine the partial damage Sn can be constituted by the highest loading value PTn within a normative activation period At of the crane's 1A first execution means 7:1 for oscillation. In the following, the normative activation period At relates to a pre-determined period of time, which is used for classifying a loading area PL, PM, PH that a loading value PTn generates.

FIG. 5B further shows a curve A in the form of a straight line illustrating an accumulated partial damage $\Sigma$ Sn that constitutes an estimate of the spent lifetime of the tree handling system 1 in hours T(h). The tree handling system 1 thus achieves a theoretical lifetime, as the accumulated partial damage $\Sigma$ Sn=1.0 i.e. in this case at an operating time H of for example 20,000 h. The curve A', also in the form of a straight line, denotes a partial damage-limiting curve. For the tree handling system 1 to be highly likely to obtain its theoretical lifetime T, it should not be loaded more than what will be regarded as normal. To prevent the tree handling system from being loaded so much that the accumulated partial damage $\Sigma$ Sn increases too quickly relative to the curve A, the limiting curve A' mentioned above is used. The limiting curve A' shows the maximum acceptable value of accumulated partial damage $\Sigma$ Sn as a function of the operating time T in hours. This curve A' is intended to constitute an upper limit that the single operating points B of the tree handling system 1 may not be exceeded. The difference between the curve A and the curve A' constitutes a value that determines how much the normative curve can be overloaded, before the control unit 24 via the actuator 23 initiates a limitation of the loading on the tree handling system 1. The limiting curve A' successively approaches the normal curve A with increasing operating time T, so that the curves A, A' coincide, when the theoretical lifetime of the tree handling system 1 is reached.

During operation of the tree handling system 1, the control unit 24, by way of the calculation means 29A, is adapted to estimate current operating points B for the tree handling system by way of accumulated partial damage $\Sigma$ Sn and information about the operating time H of the tree handling system.

FIG. 5B further shows how the operating points B for the tree handling system can vary in step with the operating time T. If a current operating point B is tangent to or exceeds the limiting curve A', the control unit 24 is thus adapted to limit the loading on the tree handling system 1. The control unit 24 can thereby be adapted to prevent the execution means 7:1 for oscillating the crane 1A and thereby the crane overall from being loaded within the high-loading area PH, even if the operator 3 with the control stick 16 requests a hydraulic flow to the first execution means 7:1 and thereby a power that requires loading PT of the crane within the high-loading area PH. Under such circumstances, the control unit 24 initiates a loading PT of the crane 1 within the medium-loading area PM and a lower hydraulic flow is obtained that the requested PB. Thereby the high partial damage values SH that loadings PT of the crane 1 within the high-loading area PH give rise to are avoided. As such a limitation of the crane's 1 loading is introduced, the subsequent operating points B, at least after a while, end below the limiting curve A'. In cases where the loading of the tree handling system's 1 crane 1A is limited, this is indicated in a suitable way by way of the indication means 17, so that the operator 3 becomes aware that the loading is limited. The indication means 17 can also comprise the function of warning an operator 3 that the current operating points B are beginning to approach the limiting curve A'. The indication means 17 can also continuously show the current loading point B and its state relative to the curves A, A'. When the operating points fall below the limiting curve A' at a certain value or reach the normative curve, the limitation of the crane's 1 loading ceases. Thereby, the crane 1 can again be utilized within the high-loading area PH. In this case, the operating points B form a curve B' that coincides with the curves A, A', as the theoretical lifetime of the crane 1 is reached.

It should be understood that the description above, which is based on analysis of the partial damage and accumulated partial damage, substantially constitutes prior art technique for managing and monitoring the lifetime of forest machines. That a partial damage is accumulated thus means that in practice it has already occurred and thereby the dynamic feedback is lacking that is required for, in practice, to serve as support for an operator in order to sensorially manage and control a tree handling system, so that an operator can avoid partial damage and at the same the tree handling system can be used to its maximum.

With reference to FIG. 5C, in detail enlargement a portion of an area between said curves A, A' is shown. An operating point for a loading PB that due to a current operating state db:1-db:n of the tree handling system selected by the operator during an activation period At is denoted B. A normative curve is denoted AX, and a partial damage-limiting curve is denoted A'X, wherein each of said curves can correspond to a normative, running operating state dbX:1-dbX:n of the tree handling system for the current and thereby actual running operating state db:1-db:n of the tree handling system selected by an operator 3.

Also referring to FIG. 6, according to the invention, a current key indicator Ni:1-Ni:n during an activation period At is determined based on at least said first sensor data 13:1-13:n. The activation period At hereby relates to the pre-determined time period during which a partial damage Sn is normally determined. The key indicator Ni:1-Ni:n hereby describes a measured value X that relates to the operation of the tree handling system 1, which measured value is representative for the risk of partial damage in relation to specific reporting about a current running operating state (db:1-db:n) of the tree handling system. Reporting about the current running operating state db:1-db:n of the tree handling system 1 is obtained by the control unit 24 comparing obtained sensor data 13:1-13:n with reference data 27 in the memory. In a subsequent step at least one of the determined current actual partial damage values SL, SM, SH is compared with a normative partial damage value SLX, SMX, SHX, retrieved from referent data 27, for a normative operating state db:1X-db:nX of the tree handling system 1 corresponding to the current key indicator Ni:1-Ni:n. Said normative operating state db:1X-db:nX is thus stored in the memory as reference data 27 and represents a pre-determined optimum operating state of the tree handling system 1 that corresponds to or at least substantially corresponds to the current actual running operating state db:1-db:n of the tree handling system 1 established via sensor data 13:1-13:n.

As shown in the partial enlargement in FIG. 5C, according to the invention, the normative curve A and the partial damage-limiting curve A' can be adjusted relative to said normative operating state db:1X-db:nX relative to the key indicator Ni:1-Ni:n. The normative curve A adjusted to the running operating state respectively the partial damage-limiting curve A' is thereby denoted AX respectively A'X in the partial enlargement.

The present arrangement can be self-learning insofar as a change that affects a measured value X that is identified and stored in the memory 26 can be constituted by a change that radically reduces the risk of partial damage of the tree handling system at a specific work operation. A change that is identified and stored can preferably be a change that has a positive effect on the key indicators that are monitored. As the information can be stored in the memory 26, it is thus possible for external users to obtain information, to process or share information via the internet. The change in question can be a change that is related to the substitution of individual components or units included in the tree handling system, for example replacement of an older harvester aggregate at the end of the crane to a more modern and more powerful harvester aggregate. Change of the crane's and/or the harvester aggregate's mutual working modes in the performance of certain types of work operations (felling—processing of trees) that can affect the measured value X in a positive direction relative to the risk of partial damage. The change can also relate to replacement of machine setting or operational parameters, service or substitution of a worn machine part, a changed working method, a changed operational mode of a machine operator or some other similar change.

To prevent the tree handling system 1 from being loaded too strongly, a change is determined that affects the measured value X of the key indicator Ni:1-Ni:n in such a manner that the current partial damage value SL, SM, SH returns to or at least approaches a level corresponding to the normative partial damage value SLX, SMX, SHX for the current key indicator. As appears from the graph in FIG. 4, this can take place by the loading on the tree handling system being reduced automatically via the actuator 23 or by the operator 3, via the operator interface 28, receiving commands according to which, through impact of the control stick 16, the operator should seek to limit the loading, for example, by manoeuvring the tree handling system's 1 crane 1A, the harvester aggregate 1B or a similar unit into a, from a loading point of view, more suitable or advantageous position or working mode to change the key indicator's Ni:1-Ni:n measured value X and thereby to the highest possible extent also avoid partial damage. The latter, namely that the measured value X and thereby the risk of partial damage can be reduced, is simply done by the operator in a work operation, based on said state-related second sensor data 13:1-13:n, through information from the operator interface 28, choosing to change the relative angle of torsion $\varphi1$-$\varphi3$ between two adjustable arm parts in the crane 1A that is included in the tree handling system 1.

FIG. 5C illustrates said change of the measured value X with an arrow that transfers the operating point B to a normal work area between both curves A, A', alternatively AX, A'X.

FIG. 7 shows a flow chart, describing how the invention can manage and control the lifetime of a tree handling system 1 by comparing a current actually occurring partial damage with the partial damage that for example felling and processing of trees should normally involve. An abnormally large partial damage can for example occur in case a less experienced operator runs the system in an unsuitable manner that generates abnormally high partial damage. In any circumstances, the control unit 24 of the arrangement according to the invention reacts to sensor data 13:1-13:n and takes damage-limiting actions, so that the occurring partial damage returns to a normal level.

At step S20, the process starts. At step S21, based on sensor data 13:1-13:n, a current actual partial damage value SL, SM, SH of the tree handling system 1 is determined.

At step S22, based on sensor data 13:1-13:n, a key indicator Ni:1-Ni:n is determined, describing a measured value X for the operation of the tree handling system 1. At step S23, a normative partial damage value SLX, SMX, SHX that corresponds to the key indicator Ni:1-Ni:n and the operating state of the tree handling system is determined. At step S24, it is assessed whether the current partial damage value SL, SM, SH is larger than or equal to the normative partial damage value SLX, SMX, SHX for the current key indicator Ni:1-Ni:n. If that is not the case, the control system 24 does not initiate any limitation of the loading PT on the tree handling system. However, if the current partial damage value SL, SM, SH is larger than or equal to the normative partial damage value SLX, SMX, SHX for the current key indicator Ni:1-Ni:n, a change of the measured value X is determined, transferring the operating point B for the tree handling system 1 towards the normative partial damage value SLX, SMX, SHX for the current key indicator Ni:1-Ni:n.

FIG. 9 schematically shows an example of an operator or user interface 28 with a graphic representation on a display of a determined key indicator Ni:1-Ni:n with a measured value X that is presented on a first axis, i.e. the y-axis, and a cumulative variable, such as an accumulated partial damage $\Sigma$ Sn on a second axis, i.e. the x-axis. By means of the driver interface 28, information can be presented to the operator 3 about the operating state db:1-db:n of the tree handling system 1 during a monitored time period as well as via an indicator line 45, information about a change of the key indicator's measured value X that is carried out, for example that the power on the crane's 1A first execution means 7:1 for oscillation of the crane via the actuator 23 from 100% power level 48 is reduced by 10% to avoid partial damage. If the measured value X of the key indicator and hence partial damage at check during a subsequent activation period At is still too high, the control unit 24 can take further power-reducing actions via the actuator 23. If new partial damage is not reported, the power limitations on the execution means 7:1-7:n can revert to normal levels, i.e. 100% power. Information about a changed measured value X of the key indicator Ni:1-Ni:n can be provided by said indicator line 45. A flag pattern 46 can be arranged on the indicator line 45, where a respective flag pattern 46 can provide information about change in combination with informative text. By means of colour perception, the colours green, yellow and red can inform an operator 3 about the degree of a changed measured value X in a flag pattern 46, in which the colours form a generally known scale, wherein red means very high risk of partial damage and also that very high power reduction on the execution means 7:1-7:n is carried out via the actuator 23. A normal level at 100% power out on the execution means 7:1-7:n is denoted 48.

FIG. 10 shows a flow chart describing a method according to the invention relative to the crane 1A and the first execution means 7:1, which is used for oscillation of the crane in the horizontal plane, wherein each of said units are included in a tree handling system 1 according to the invention.

At step S1, the process starts. At step S2, the control unit 24 receives a request from the operator 3, by means of the control stick 16 for the desired hydraulic flow PB and thereby the power of the crane's 1A first execution means 7:1 for oscillation of the crane. With knowledge of current accumulated partial damage $\Sigma$ Sn and operating time H, the control unit 24, at step S3, determines the current operating point B for the first execution means 7:1. At step S4, the control unit 24 compares if operating point B is tangent with or lies above the limiting curve A', A'X. If that is not the case, the control unit 24 does not initiate any limitation of the loading PT on the first execution means 7:1, which at step S5 gives the requested hydraulic flow and thereby the power PB.

Subsequently, the control unit 24 thus, at step S6, establishes whether the loading PT on the first execution means 7:1 is a single loading value PTn, which is to be used for estimating a partial damage:

If the loading PT is not deemed to be such a single loading value PTn, the process begins anew from the start without any partial damage S being registered.

A single loading value PTn for determination of partial damage can for example be constituted by a highest loading value PT within an activation period At of the first execution means 7:1 and thereby of the crane 1A.

At step S7, it is assessed whether the single loading value PTn that is to be used for estimating a partial damage S is a single loading value PTn with a partial damage Sn within the area: PL, PM, PH or a loading value PTnX with key indicator Ni:1-Ni:n.

However, if the loading value PT constitutes a single partial damage-determining loading value PTn, it is estimated at step S8 within which loading area PL, PM, PH the loading value PTn lies (see FIG. 5A). Subsequently, at step S8, the partial damage SL, SM, SH corresponding to the loading value PTn is determined. This value SL, SM, SH thereby constitutes a partial damage Sn for the loading value PTn. At step S9, the partial damage Sn is added to previously accumulated partial damage Σ Sn, so that a new value of the accumulated partial damage Σ Sn is obtained.

Thereafter the process begins anew from the start.

If the control unit 24, at step S4, instead ascertains that the operating point B is tangent to or lies above the limiting curve A', A'X (see FIGS. 5B and 5C), the control unit 24 is adapted to limit the loading PT on the first execution means 7:1 for oscillation of the crane 1A. The control unit 24 thereby determines, at step S10, a maximum value PTmax that is highest permissible loading of the first execution means 7:1. The control unit 24 can for example limit the loading on the first execution means 7:1 PTmax to the value PM, which prevents loading on the first execution means 7:1 within the high-pressure area PH. The control unit 24 can also at step S10 determine the flow power Pmax that is obtained with the maximum permissible loading on the first execution means 7:1. At step S11, the control unit 24 determines whether the flow power PB requested by the operator is equal to or lower than the maximum permissible flow power Pmax. If that is the case, it means that the requested power PB can be allowed, and the first execution means 7:1 is loaded, at step S5, with the loading PT, which thus is lower than the maximum permissible loading on the first execution means 7:1 PTmax. Thereafter the process continues with step S6 and optionally steps S8 and S9 in a corresponding manner as described above. If the control unit 24, at step S11, instead ascertains that the operator requests a power PB that is larger than the maximum permissible power PB, the control unit 24 is adapted to limit the power to the maximum permissible power Pmax. Thereby the control unit 24 limits the loading PT on the first execution means 7:1, at step S12, to the maximum permissible loading value PTmax. Thereafter the process continues with step S6 and optionally steps S8 and S9 in a corresponding manner as described above.

According to the invention, the control unit 24, at step S7, thus establishes whether the loading PT on the first execution means 7:1 is a single loading value PTn with a partial damage Sn within the area: PL, PM, PH or a loading value PTnX with key indicator Ni:1-Ni:n relating to the operation of the first execution means 7:1 and which is representative of the risk of partial damage in relation to specific reporting about a current running operating state (db:1-db:n) of the first execution means 7:1.

If the control unit 24, at step S7, instead of as is described above, ascertains that the partial damage-determining loading value PTn is a loading value PTnX with key indicator Ni:1-Ni:n, it is estimated at step S13, within which loading area SLX, SMX, SHX the loading value PTnX with key indicator (Ni:1-Ni:n) is found (see FIGS. 5A-5C). Subsequently, at step S13, the partial damage SLX, SMX, SHX corresponding to the loading value PTnX is determined. This value SLX, SMX, SHX thereby constitutes a partial damage SnX, which is related to a particular Ni:1-Ni:n relative to specific reporting about a current operating state db:1-db:n of the first execution means 7:1.

At step S9, the partial damage SnX with key indicator Ni:1-Ni:n is added to previously accumulated partial damage Σ Sn, so that a new value of the accumulated partial damage Σ Sn is obtained.

If, according to the invention, at step S13, it is ascertained that the partial damage SL, SM, SH is a partial damage SnX with key indicator Ni:1-Ni:n, the control system 24 ensures that the operator 3, at step S14, is warned of prevalent harmful operating conditions (for example reckless driving, unsuitable crane angle, etc.) via the indication means 17 (the interface 28) in the driver's cabin 2, and moreover, the control means 24, at step S15, can determine a new PTmax' that is the maximum permissible loading on the crane's 1 execution means 7:1 for oscillation. At step 44, the control unit 24 determines the new flow power Pmax', which due to the prevalent harmful operating conditions indicates a new maximum permissible loading on the crane's 1A execution means 7:1 for oscillation.

As described above, the loading PT on the first hydraulic cylinder 10 and thereby the crane 1 is limited by said new PTmax' of the actuator 23 operably coupled to the control unit 24.

Thereafter the process begins anew from the start.

What is claimed is:

1. A method for managing and controlling a lifetime of a tree handling system, comprising a crane equipped with a tree handling unit, and which tree handling system is activable at varying loading values by means of hydraulically powered execution means, each of which can create a force impact on the tree handling system and are activable with varying loading values (PT) through an operator's impact of a control stick, which via a hydraulic system adjusts a hydraulic flow to and from said execution means, wherein the tree handling system and associated execution means form part of a forest machine, and which method comprises:

obtaining a first sensor data from pressure sensors that represent a current loading (PT) on at least one of the crane and the tree handling unit included in the tree handling system, determining a current partial damage value (SL, SM, SH), which during a normative activation period (At) is deemed to occur on the tree handling system at various loadings (PT) on the tree handling system, determining a key indicator, which describes a measured value (X) that relates to an operation of the tree handling system (1) and is representative of a risk of partial damage relative to specific reporting about a current running operating state of the tree handling system, comparing the current partial damage value (SL, SM, SH) with a normative partial damage value (SLX, SMX, SHX) for a normative operating state of the tree handling system corresponding to the key indicator and determining a change that affects the measured value (X) of the key indicator in such a manner that the current partial damage value (SL, SM, SH) returns to or approaches a level corresponding to the normative partial damage value (SLX, SMX, SHX) for the key indicator, wherein said change that affects the measured value (X) is executed by an actuator coupled to a control unit by reducing hydraulic flow to at least one of the execution means so as to limit the loading (PT) of the tree handling system to a pre-determined maximum loading value (PTmax).

2. The method according to claim 1, comprising a step of adding each estimated partial damage (SL, SM, SH) to an accumulated partial damage (Σ Sn), which constitutes an estimate of a total spent lifetime of the tree handling system.

3. The method according to any one of claim 1, wherein a change of the key indicator's measured value (X) comprises to limit the loading (PT) of the tree handling system to a highest permissible loading value (PMAX), if the partial damage value (SL, SM, SH) exceeds the normative partial damage value (SLX, SMX, SHX) resulting from the determined key indicator.

4. The method according to any one of claim 1, further comprising; obtaining a second sensor data from position sensors, which are representative of a mutual relationship between at least two adjustable and manoeuvrable units of the tree handling system, wherein the current key indicator is determined on a basis of a combination of said first and second sensor data.

5. The method according to claim 1, further comprising presenting in a driver interface to an operator of the tree handling system information about the key indicator together with information about the operating state of the tree handling system during a monitored time period; and either;
    presenting to the operator a change of the key indicator's measured value (X) that takes place and how it will affect the key indicator, or
    suggesting to the operator a change of the key indicator's measured value (X) and how it will affect the key indicator.

6. The method according to claim 1, further comprising changing the tree handling system's operating state to manage the measured value (X) of the key indicator towards a desired value according to a difference between the key indicator and the change presented in a driver interface.

7. The method according to claim 1, further comprising changing the tree handling system's operating state to manage the determined current key indicator towards a desired measured value (X) by limiting a hydraulic flow to one or more execution means included in at least one of the following units; the crane, the tree handling unit or a combination of said units to a highest permissible loading value (PMAX).

8. The method according to claim 1, further comprising storing in a data base or a memory information about a change that can affect a measured value (X) of the key indicator.

9. The method according to claim 8, wherein information about a change comprises at least one of the following:

type of change, measured value (X) before the change compared to measured value (X) after the change, operating state before the change compared to operating state after the change.

10. The method according to claim 1, wherein the change is determined automatically by the control unit on a basis of said first sensor data from pressure sensors and second sensor data from position sensors.

11. An arrangement for managing and controlling a lifetime of a tree handling system for a forest machine, which arrangement comprises:
    a crane carrying a tree handling unit, execution means each of which can create a force impact on the tree handling system and are activable with varying loading values (PT) through an operator's impact of a control stick, which via a hydraulic system adjusts a hydraulic flow to and from said execution means, wherein the arrangement further comprises:
    a control unit adjusted to receive information about the loading (PT) on at least one of the crane and the tree handling unit included in the tree handling system, wherein this information comprises,
    first sensor data from pressure sensors and second sensor data from position sensors,
    an actuator, which is coupled to the control unit and by which, through hydraulic flow reduction to at least one of the execution means, the loading (PT) on the tree handling system can be limited to a pre-determined maximum loading value (PTmax), wherein
    the control unit is arranged to determine one or a plurality of current partial damage values (SL, SM, SH), which during a normative activation period (At) is deemed to occur on the tree handling system at various loadings (PT) on the tree handling system,
    the control unit is arranged to determine a current key indicator, which describes a measured value (X) that relates to an operation of the tree handling system and is representative of a risk of partial damage in relation to specific reporting about a current running operating state of the tree handling system,
    at least one of the determined current partial damage values (SL, SM, SH) is compared with a normative partial damage value (SLX, SMX, SHX), for a normative operating state of the tree handling system corresponding to the current key indicator, and
    a change that affects the measured value (X) of the key indicator is determined in such a manner that the current partial damage value (SL, SM, SH) returns to or approaches a level corresponding to the normative partial damage value (SLX, SMX, SHX) for the current key indicator, and which arrangement further comprises,
    wherein said change of the measured value (X) is executed by the actuator coupled to the control unit.

12. The arrangement according to claim 11, wherein both the normative partial damage value (SL, SM, SH) and the normative operating state corresponding to the key indicator are stored as reference data of the control system.

13. The arrangement according to claim 11, wherein first sensor data comprise data from pressure sensors that are arranged in the tree handling system and can represent a current loading (PT) on at least one of the crane or the tree handling unit included in the tree handling system.

14. The arrangement according to claim 11, wherein second sensor data comprise data from pressure sensors that are arranged in the tree handling system and can represent reporting about a mutual angle position or position relationship between at least two units adjustable or maneuverable relative to each other that are included in one of the crane or the tree handling unit included in the tree handling system.

15. The arrangement according to claim 11, wherein the hydraulic system is electronically active and comprises valve control curves with which a hydraulic flow to said execution means can be adjusted by impact of the control stick, and the actuator comprises correction factor curves with which said valve control curves and can be adjusted for limitation of the force impact that is supplied to said execution means.

16. The arrangement according to claim 11, wherein the control unit is arranged to receive information from a pressure sensor that senses an internal hydraulic pressure in at least one circuit that supplies an execution means with hydraulic flow to determine the loading (PT) on the tree handling system.

17. The arrangement according to claim 14, wherein said second sensor data comprise data from position sensors with reporting about an angle of torsion ($\varphi_1 - \varphi_3$) of a rotation axis of at least one of axes of motion that are included in the tree handling system's crane.

18. The arrangement according to claim 11, wherein the control unit, is configured to at least: identify the change that affects the partial damage of the tree handling system of the forest machine, store information about the changes in a memory and to use the information about the changes to present the key indicator with a measured value (X), describing a combination of the current running operating state and the partial damage occurring in the tree handling system, an operator interface with which this information can serve as support or supplement for the operator for changing a driving behavior in order to reduce the risk of the partial damage.

* * * * *